(12) United States Patent
Inai (10) Patent No.: US 12,538,013 B2
(45) Date of Patent: Jan. 27, 2026

(54) ELECTRONIC APPARATUS THAT SUPPLIES AND RECEIVES POWER TO AND FROM EXTERNAL APPARATUS, CONTROL METHOD AND NON-TRANSITORY COMPUTER READABLE MEDIUM THEREFOR

(71) Applicant: CANON KABUSHIKI KAISHA, Tokyo (JP)

(72) Inventor: Kento Inai, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/465,008

(22) Filed: Sep. 11, 2023

(65) Prior Publication Data
US 2024/0089587 A1    Mar. 14, 2024

(30) Foreign Application Priority Data
Sep. 14, 2022   (JP) ................... 2022-146104

(51) Int. Cl.
*H04N 23/63*   (2023.01)
*H04N 23/62*   (2023.01)
*H04N 23/65*   (2023.01)

(52) U.S. Cl.
CPC ........... *H04N 23/633* (2023.01); *H04N 23/62* (2023.01); *H04N 23/65* (2023.01)

(58) Field of Classification Search
CPC ...... H04N 23/633; H04N 23/62; H04N 23/65; G06F 3/0488; G06F 1/266; G06F 3/04842
See application file for complete search history.

(56) References Cited

U.S. PATENT DOCUMENTS

2014/0325384 A1* 10/2014 Kobayashi .............. H04W 8/22
  715/748
2015/0244185 A1*  8/2015 Won ...................... G06F 1/266
  320/103

FOREIGN PATENT DOCUMENTS

JP        2018007450 A    1/2018

* cited by examiner

*Primary Examiner* — Mekonnen D Dagnew
(74) *Attorney, Agent, or Firm* — Canon U.S.A., Inc. IP Division (57) ABSTRACT

An electronic apparatus that supplies and receives power to and from an external apparatus connected to the electronic apparatus. The electronic apparatus performs control such that a predetermined icon is displayed on a display. The electronic apparatus detects a predetermined touch operation on the predetermined icon displayed on the display. The electronic apparatus performs control such that a predetermined screen is displayed on the display together with the predetermined icon in accordance with the predetermined touch operation on the predetermined icon detected. The predetermined screen includes information on a direction of power flow between the electronic apparatus and the external apparatus connected to the electronic apparatus.

16 Claims, 5 Drawing Sheets

ELECTRONIC APPARATUS THAT SUPPLIES AND RECEIVES POWER TO AND FROM EXTERNAL APPARATUS, CONTROL METHOD AND NON-TRANSITORY COMPUTER READABLE MEDIUM THEREFOR

BACKGROUND

Field

The present disclosure relates to an electronic apparatus that is suppliable and receivable power, and a control method for the electronic apparatus.

Description of the Related Art

As an interface for wired communication used for recent electronic apparatuses (e.g., cameras), a technique to transmit power parallel with data transfer may be used. For example, power may be transmitted using a universal serial bus (USB).

In a standard USB-power delivery (PD), that is, in the USB-PD standard, a power supplying apparatus (e.g., USB host controller, AC adaptor) can supply power up to 100 W to a power receiving apparatus via a USB cable.

Further, in the USB-PD standard, two apparatuses interconnected via a cable can freely determine which apparatus supplies power.

Japanese Patent Application Publication No. 2018-007450 discloses a technique to control the power supplying direction based on instruction by the user. According to Japanese Patent Application Publication No. 2018-007450, when an information processing apparatus and an external apparatus are connected, the user can confirm on a specific screen whether the information processing apparatus is in power receiving state or power feeding state.

With the technique disclosed in Japanese Patent Application Publication No. 2018-007450, however, it is assumed that the specific screen is displayed only when the information processing apparatus and an external apparatus are connected, or when roles thereof are changed. Therefore it is not easy for the user to confirm the power supplying state among a plurality of apparatuses after the plurality of apparatuses are connected.

SUMMARY

With the foregoing in view, various embodiments of the present disclosure provide techniques to easily confirm the power feeding state among a plurality of apparatuses.

According to one embodiment of the present disclosure, an electronic apparatus is provided that is capable of supplying and receiving power to and from respectively an external apparatus connected to the electronic apparatus. The electronic apparatus including: a display; at least one memory; and at least one processor, the at least one memory and the at least one process together functioning as: a control unit configured to perform control such that a predetermined icon is displayed on the display; and a detection unit configured to detect a predetermined touch operation on the predetermined icon displayed on the display, wherein the control unit performs control such that a predetermined screen is displayed on the display together with the predetermined icon in accordance with the predetermined touch operation on the predetermined icon detected by the detection unit, the predetermined screen including information on a direction of power flow between the electronic apparatus and the external apparatus connected to the electronic apparatus.

According to one embodiment of the present disclosure, a control method is provided for an electronic apparatus that is capable of supplying and receiving power to/from a connected external apparatus, the method including: displaying a predetermined icon on a display; detecting a predetermined touch operation on the predetermined icon displayed on the display; in a case where the predetermined touch operation on the predetermined icon is detected in the detecting, performing a control such that a predetermined screen is displayed on the display together with the predetermined icon, the predetermined screen including information on a direction of power flow between the electronic apparatus and the external apparatus connected to the electronic apparatus.

Further features of the present disclosure will become apparent from the following description of exemplary embodiments with reference to the attached drawings.

DESCRIPTION OF THE EMBODIMENTS

Various embodiment of the present disclosure will be described below with reference to the accompanying drawings.

Embodiments

Figure 1A:
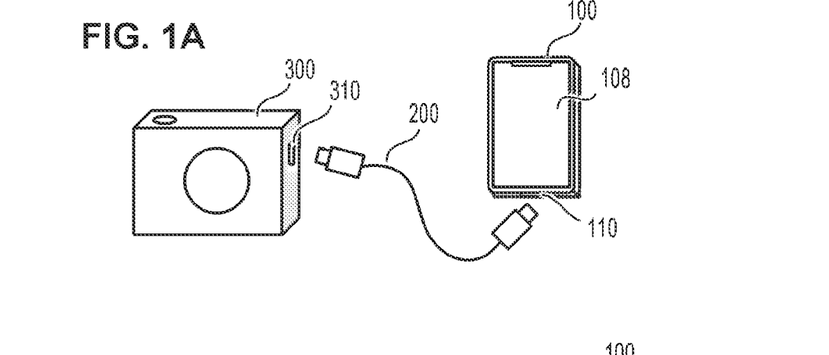
FIGS. 1A and 1B are diagrams for describing an electronic apparatus according to an embodiment.

An electronic apparatus 100 and an imaging apparatus 300 according to an embodiment will be described with reference to FIG. 1A. FIG. 1A is a schematic diagram depicting a connection of the electronic apparatus 100 and the imaging apparatus 300 (external apparatus).

The electronic apparatus 100 is an electronic apparatus conforming to the USB-PD standard. A display 108 includes a liquid crystal display and the like. The display 108 includes a touch detection unit (touch panel) which can detect touch operation. A connection unit 110 is a connection unit to connect a cable 200. The connection unit 110 is a USB Type-C connector in the present embodiment. The electronic apparatus 100 is a smartphone, for example.

The cable 200 is a cable for wired communication. The cable 200 is a USB cable in the present embodiment. The electronic apparatus 100 can be connected to various external apparatuses, such as the imaging apparatus 300, via the cable 200.

The imaging apparatus 300 is an external apparatus of the electronic apparatus 100. The imaging apparatus 300 is also an electronic apparatus conforming to the USB-PD standard. The imaging apparatus 300 includes a connection unit 310. The connection unit 310 is a connection unit to connect the cable 200. In the present embodiment, the connection unit 310 is a USB Type-C connector, just like the connection unit 110.

When the electronic apparatus 100 and the imaging apparatus 300 are connected via the cable 200, power transmission (supply and reception) and data communication are enabled between the electronic apparatus 100 and the imaging apparatus 300.

Figure 2:
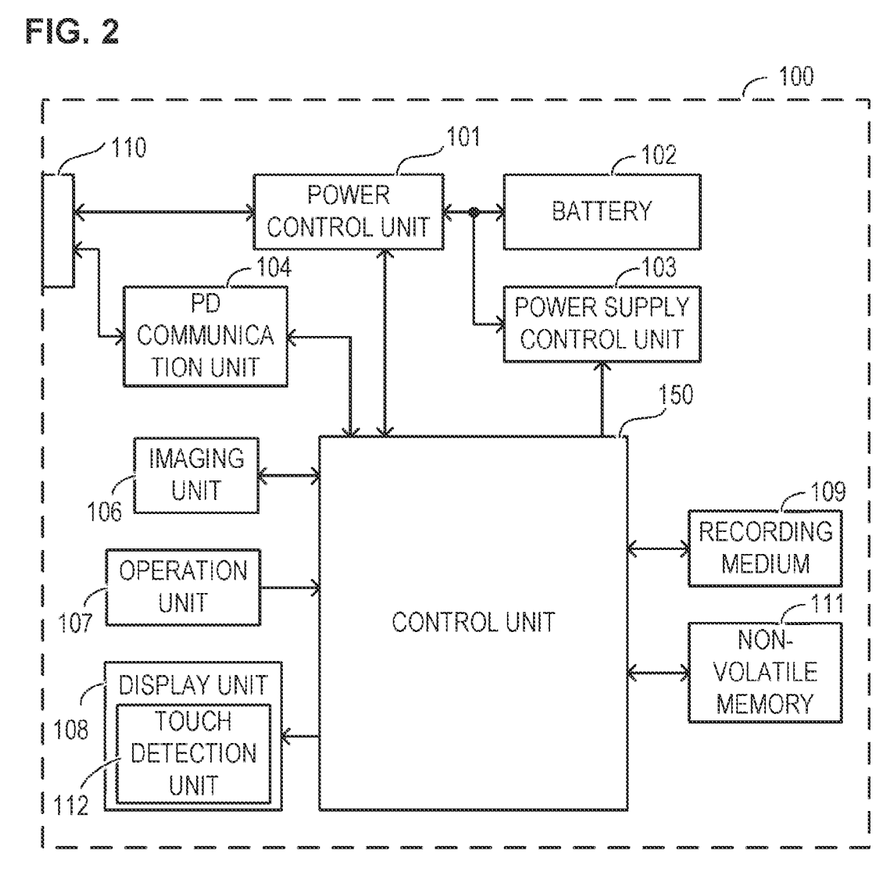
FIG. 2 is a block diagram of the electronic apparatus according to the embodiment.

FIG. 2 is a block diagram of the electronic apparatus 100. The electronic apparatus 100 includes: a power control unit 101, a battery 102, a power supply control unit 103, a PD communication unit 104, an imaging unit 106, an operation unit 107, the display 108, a recording medium 109, a connection unit 110, a non-volatile memory 111, a touch detection unit 112, and a control unit 150. In the description on FIG. 2, the electronic apparatus 100 is connected to the imaging apparatus 300, so as to be communicable via the cable 200.

The power control unit 101 controls the transfer (supply and reception) of power. The power control unit 101 conforms to the USB power delivery (USB-PD) standard. The power control unit 101 receives power from an external apparatus connected via the connection unit 110, and supplies power to the external apparatus. The power control unit 101 includes a DC/DC convertor, a charging circuit, and the like. The power control unit 101 is connected with a power supply terminal (VBUS terminal in the present embodiment) of the connection unit 110. The power control unit 101 can also supply power of the battery 102 to the imaging apparatus 300 via the connection unit 110. Further, the power control unit 101 can charge the battery 102 using the power received from the imaging apparatus 300 via the connection unit 110.

The battery 102 is such a battery as a lithium ion battery. The battery 102 is included in the electronic apparatus 100. The power supply control unit 103 includes a DC/DC convertor and the like. The power supply control unit 103 supplies power to various circuits of the electronic apparatus 100 using power acquired from the power control unit 101 or the battery 102. In the present embodiment, the electronic apparatus 100 includes one battery 102, but may include a plurality of batteries 102.

The PD communication unit 104 is connected with a communication terminal (Configuration Channel (CC) terminal in the present embodiment) of the connection unit 110. The PD communication unit 104 executes data communication with the imaging apparatus 300 (and an IC included in the cable 200) based on the USB-PD standard, for example. The PD communication unit 104 determines whether the imaging apparatus 300 and the cable 200 conform to the USB-PD standard. The PD communication unit 104 (electronic apparatus 100) performs negotiation communication based on the communication protocol specified in the USB-PD standard, and requests the imaging apparatus 300 to supply desired power. On the other hand, the PD communication unit 104 can also perform negotiation communication in the case of supplying power from the electronic apparatus 100 to the imaging apparatus 300.

The imaging unit 106 acquires image information by imaging (capturing an image of) a subject. The imaging unit 106 includes imaging lenses (lenses used for zooming and focusing of a subject image), and an image pickup element (element to convert a subject image into electric image information). The control unit 150 performs image processing (e.g., compression processing) on the image information acquired by the imaging unit 106, and then this image information is recorded in the recording medium 109 as a captured image.

The operation unit 107 includes operation members, such as a button, a dial, and the like. The operation unit 107 is used for controlling the electronic apparatus 100, for example. By operating the power supply button of the operation unit 107, the user can instruct power ON/OFF to the electronic apparatus 100.

The display 108 displays information related to the state of the electronic apparatus 100, information in accordance with various applications, and the like. The display 108 includes the touch detection unit 112, which is an electrostatic capacitance type touch panel, for example. The touch detection unit 112 can detect the user's touch operation on the display 108 (=touch detection unit 112). The touch detection unit 112 can identify and detect not only a simple one touch operation, but also such operations as press and hold, swipe, double tap (double touch) and Pinch-Out (Pinch-Open). The touch detection unit 112 can detect the operation performed by the user, hence may be regarded as one of the operation members of the operation unit 107.

The recording medium 109 includes a NAND flash memory, and the like. The recording medium 109 stores image data and data for various applications. The recording medium 109 may be removable from the electronic apparatus 100, like an SD card.

The connection unit 110 is a USB Type-C connector in the present embodiment.

The non-volatile memory 111 includes a NOR flash memory, and the like. The non-volatile memory 111 stores a control program of the electronic apparatus 100, and the like. The non-volatile memory 111 may be removable from the electronic apparatus 100, like an SD card.

The control unit 150 controls the electronic apparatus 100 in general. The control unit 150 includes a microprocessor (CPU) and RAM, for example. The control unit 150 loads a control program, which has been stored in the non-volatile memory 111 in advance, to the RAM, and executes the program, so as to control the general operation of the electronic apparatus 100. Here the control program includes programs to execute later mentioned various flow charts (see FIGS. 3A and 3B) of the present embodiment. For example, the control unit 150 controls display of the display 108. The control unit 150 can also determine that the imaging apparatus 300 and the cable 200 are connected to the electronic apparatus 100 (connection unit 110) via the power control unit 101 and the PD communication unit 104. In the case where the electronic apparatus 100 functions as a smartphone, the control unit 150 reads programs of various applications from the non-volatile memory 111, and executes the programs.

A predetermined screen (confirmation screen) 120 (screen displayed on the display 108) to display information on USB connection (connection information), battery information, and the like, will be described with reference to FIG. 1B. The USB connection refers to the connection conforming to the USB standard.

In the present embodiment, an icon (also called display item) 180 is always displayed on the display 108 if the power of the electronic apparatus 100 is ON. In other words, the icon 180 is displayed not only when the home screen is displayed, but also when applications to implement various functions are activated. If the icon 180 is pressed and held (touch operation by the user), the confirmation screen 120 is displayed. The confirmation screen 120 may be displayed by another predetermined touch operation, such as one touch, swipe, double tap, Pinch-Out, or the like, instead of press and hold.

The icon 180 is an icon that indicates the residual capacity of the battery 102. In the icon 180, the width of an indicator (shaded portion of the icon 180) changes in accordance with the residual capacity of the battery 102. The icon 180 may be an icon that indicates the state of the USB connection, for example.

The confirmation screen 120 includes connection information (power direction information 181, changing state information 182, and communication type information 183), and battery information (residual capacity information 184, deterioration level information 185). The connection information is information on the connection state between the electronic apparatus 100 and an external apparatus (imaging apparatus 300). The battery information is information on the state of the battery 102.

The power direction information 181 indicates a direction of power flow (one of the power states) in the USB connection between the electronic apparatus 100 and the external apparatus. In FIG. 1B, the power direction information 181 indicates "receiving", which is the state where the electronic apparatus 100 is receiving power. In the case where power is being supplied from the electronic apparatus 100, on the other hand, the power direction information 181 indicates "supplying". In the case where there is no transmission of power between the electronic apparatus 100 and the external apparatus, the power direction information 181 indicates "stop". Along with the power direction information 181, the amount of supplied power, expected time for supplying power, or the like, may be displayed as a power state.

The charging state information 182 indicates the charging state of the battery 102. In FIG. 4B, the charging state information 182 indicates that the battery 102 is being charged by indicating "charging". In accordance with the charging state of the battery 102, the charging state information 182 indicates, for example, "charging complete" which is the state where charging has completed, or "charging stop" which is the state where charging stopped due to insufficient power to supply, high temperature/low temperature environment, or the like. Besides power supplied from an external apparatus connected to the connection unit 110, the battery 102 may be charged by power supplied from another power supply (e.g., AC power supply). In such a case where the battery 102 is being charged from a power supply other than that of the external apparatus connected to the connection unit 110 as well, "charging" is indicated as the charging state information 182. Therefore in the present embodiment, the charging state of the battery 102 is not included in the power state between the electronic apparatus 100 and an external apparatus.

The communication type information 183 indicates the communication state (type of data communication and whether communication is ongoing) between the electronic apparatus 100 and the external apparatus via USB connection. In the example in FIG. 1B, the communication type information 183 indicates "file transfer (PTP)", which means that a file is being transferred by the picture transfer protocol (PTP), which is a type of image transfer protocol. In the case where data transfer is not being performed in the electronic apparatus 100, the communication type information 183 indicates "none", for example.

The residual capacity information 184 indicates the residual capacity of the battery 102. In the example in FIG. 1B, the residual capacity information 184 indicates that the residual capacity of the battery 102 is "60%". The width of the indicator (shaded portion) and the value of the residual capacity, indicated in FIG. 1B, change in accordance with the usage state and charging state of the battery 102.

The deterioration level information 185 indicates the deterioration level (deterioration degree) of the battery 102. In the example in FIG. 1B, "no deterioration" is displayed, that is, the deterioration level information 185 indicates that the battery 102 has not deteriorated. As a number of times of recharging the battery 102 increases, the deterioration state of the battery 102 changes. The user can recognize (confirm) an appropriate time to replace the battery 102 by the indication of the deterioration level of the battery 102. When the user touches the OK button 186, display of the confirmation screen 120 ends, and the screen returns to the "display immediately before displaying the confirmation screen 120". For example, if the "display immediately before displaying the confirmation screen 120" is a screen of a predetermined application, this screen of the predetermined application is displayed again with the icon 180 when the user touches the OK button 186.

Icons 190 are displayed with the confirmation screen 120. The icons 190 are icons of the applications of the electronic apparatus 100. The icons 190 are icons to startup applications that implement various functions (e.g., call function, mail function, camera function, and music reproduction function). The icon 180 is different from the icons 190 to startup applications. The icons 190 are displayed when a home screen (home screen and confirmation screen 120) is displayed, for example, and are not displayed when an application to implement each function is started up.

On the confirmation screen 120, other information related to the USB connection (connection information) and battery information may be displayed. For example, the battery information includes at least one of: information on the residual capacity, a number of units, authentication (whether electronic apparatus 100 has authenticated each battery), and deterioration level of one or plurality of batteries 102 included in the electronic apparatus 100.

(Other Examples of Icon 180) Examples of icon 180, other than the example in FIG. 1B, will be described with reference to FIGS. 4A to 4D. All examples of the icon 180 indicate information on power in the electronic apparatus 100. The icon to indicate information on power (e.g., battery mark) is displayed constantly or in most cases on a commonly used smartphone, imaging apparatus (digital camera), or the like. Therefore there is no need to display a dedicated icon on the electronic apparatus 100, to instruct display of the confirmation screen 120 to check the power state with an external apparatus. It is also unnecessary to display a new dedicated icon to instruct the display of the confirmation screen 120 on the electronic apparatus 100, as an icon that is normally not displayed on a commonly used smartphone or the like (an icon other than default icons). Further, power state is also information on power, so the user feels normal to see the display of the confirmation screen 120 which includes the power state, by a predetermined touch operation on an icon indicating information on power. Therefore this kind of display transition is very convenient for the user. In the present embodiment, the user can display the confirmation screen 120 by using an "operation menu screen that is displayed by touching a menu icon (not illustrated)". Then by a predetermined touch operation on the icon 180 indicating information on the battery, the user can display the confirmation screen 120 without operating the menu screen.

Figure 4A:
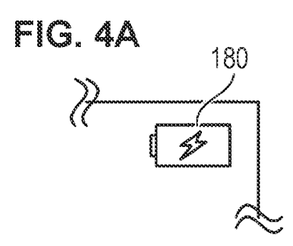
FIGS. 4A to 4D are diagrams for describing icons according to the embodiment.
Figure 4B:
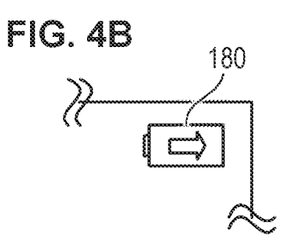

As illustrated in FIG. 4A, the icon 180 may indicate a charging state of the battery 102. Specifically, the icon 180 in FIG. 4A is an icon to indicate that the battery 102 is being charged. For example, the icon 180 in FIG. 4A is displayed when the electronic apparatus 100 is receiving power supplied from the external apparatus and is charging the battery 102 thereby.

As illustrated in FIG. 4B, the icon 180 may indicate a direction of power flow between the electronic apparatus 100 and the external apparatus. Specifically, the icon 180 in FIG. 4B is an icon to indicate that the power is being supplied from the battery 102 to the external apparatus.

Figure 4C:
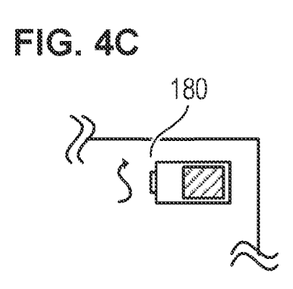

As illustrated in FIG. 4C, the icon 180 may indicate a communication state between the electronic apparatus 100 and the external apparatus, along with the information on the residual capacity of the battery 102. Specifically, the icon 180 in FIG. 4C is an icon to indicate that a USB apparatus is connected to the electronic apparatus 100, and the electronic apparatus 100 is in communication. For example, the icon 180 in FIG. 4C is displayed when the electronic apparatus 100 is connected to a PC or the like, and is performing USB communication therewith.

Figure 4D:
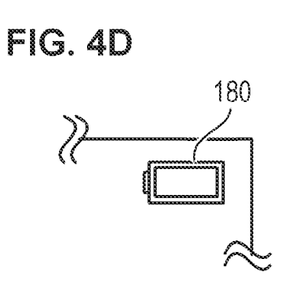

As illustrated in FIG. 4D, the icon 180 may indicate a type of power supply driving the electronic apparatus 100. Specifically, the icon 180 in FIG. 4D is an icon to indicate that the electronic apparatus 100 is in AC adaptor driving (driving based on power of the AC adaptor), and is not in battery driving (driving based on power of the battery 102). In a case where the electronic apparatus 100 is a digital camera or the like, such a product may be driven by the power outputted from the AC adaptor, separate from the power outputted from the battery 102. For example, when such an electronic apparatus 100 is in use and is being driven by the AC adaptor, the icon 180 in FIG. 4D is displayed.

In FIGS. 4A to 4D, examples of the icon 180 with various designs were described, but a form (design) of the icon 180 is not limited to these modes, and may be various other modes (shapes, patterns or colors). For example, in the case where the electronic apparatus 100 is an imaging apparatus, an icon indicating a DC coupler (DC coupler to connect the AC adaptor) may be displayed if the DC coupler can be connected instead of the battery.

Figure 3A:
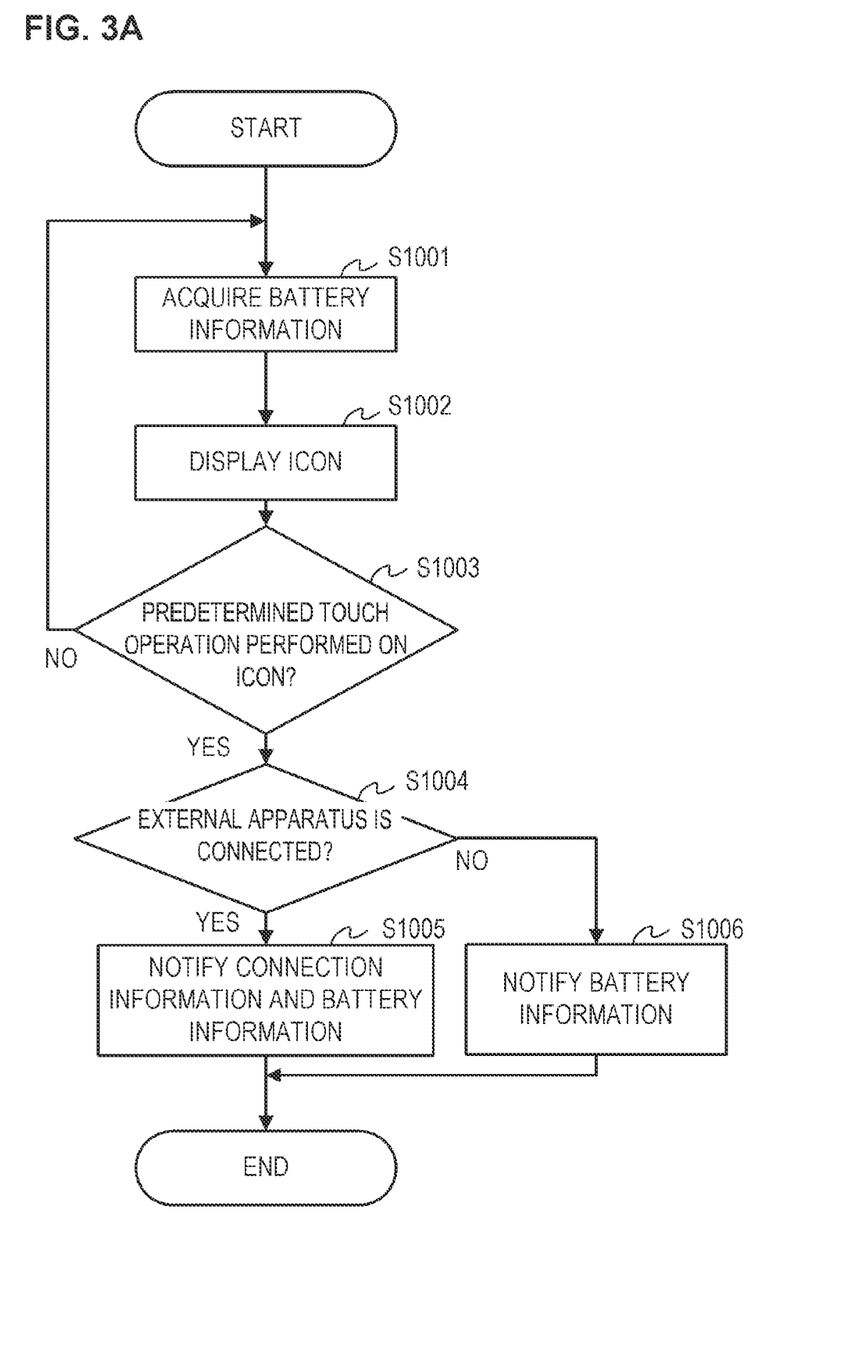
FIGS. 3A and 3B are flow charts for describing processing of the electronic apparatus according to the embodiment.
Figure 3B:
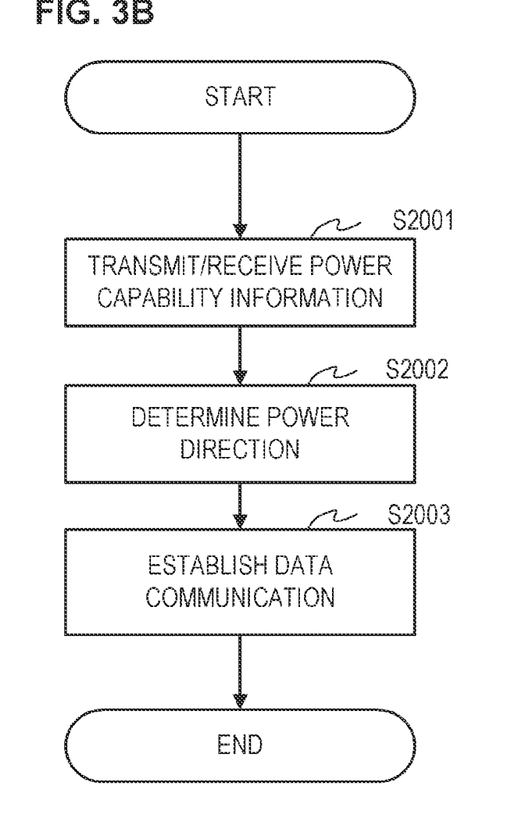

(Processing by Electronic Apparatus) Processing of the electronic apparatus 100 will be described with reference to FIGS. 3A and 3B. FIG. 3A is a flow chart for describing processing of the electronic apparatus 100 in accordance with a predetermined touch operation to the icon 180. FIG. 3B is a flow chart for describing processing of the electronic apparatus 100 when USB is connected. The processing steps in the flow charts in FIGS. 3A and 3B are executed by the control unit 150 in accordance with the programs stored in the non-volatile memory 111, for example.

The processing in the flow chart in FIG. 3A is started when the power of the electronic apparatus 100 turns ON (when the electronic apparatus 100 is started).

In step S1001, the control unit 150 acquires information on the battery 102 (battery information) via a communication line. The battery information includes information on the residual capacity of the battery 102, deterioration level of the battery 102, charging state of the battery 102, internal temperature of the battery 102, and the like.

In step S1002, the control unit 150 displays the icon 180 on the display 108. For example, as illustrated in FIG. 1B, the control unit 150 displays the icon 180, which indicates the residual capacity of the battery 102, at a predetermined position of the display 108, such as at an upper right edge of the display 108, as illustrated in FIG. 1B. Thereby if the power of the electronic apparatus 100 is ON (if the electronic apparatus 100 is started), the icon 180 is always displayed. However, the icon 180 may not always be displayed, but may not be displayed except in a special case (e.g., in a case where an image is actually being captured). For example, the icon 180 is displayed at least in one of the following cases: a live view image is displayed to prepare for image capturing; a captured image is reproduced; and a screen to perform setting for image capturing is displayed. Here the live view image is an image of a subject that the imaging unit 106 is capturing in real-time. In other words, the live view image is an image indicating the current state of the subject.

In step S1003, the control unit 150 determines whether the predetermined touch operation on the icon 180 displayed in step S1002 is detected (whether the predetermined touch operation was performed). Processing advances to step S1004 if it is determined that the predetermined touch operation on the icon 180 is detected. Processing advances to step S1001 if it is determined that the predetermined touch operation on the icon 180 is not detected. The predetermined touch operation is one of: press and hold, simple one touch operation, swipe, double tap, and Pinch-Out, for example.

In FIG. 3A, it is assumed that the execution cycle of the processing in step S1003 (time required from execution of the processing in step S1003 to the next execution of the processing in step S1003) is the same as the execution cycle of the processing in step S1001, to simplify description. However, the execution cycle of the processing in S1001 may be much longer than the execution cycle of the processing in step S1003. The processing in step S1003 may be repeated much faster using interrupt processing, and the processing in step S1001 may be performed at a cycle once every 30 seconds, for example. Then the processing in the flow charts in FIGS. 3A and 3B can be executed without unnecessarily increasing CPU occupancy by the control unit 150.

In step S1004, the control unit 150 determines whether the external apparatus is connected to the electronic apparatus 100. Processing advances to S1005 if it is determined that the external apparatus is connected to the electronic apparatus 100. Processing advances to S1006 if it is determined that the external apparatus is not connected to the electronic apparatus 100. The control unit 150 determines whether or not "the external apparatus is connected to the electronic apparatus 100" by determining whether or not "USB connection is performed to the connection unit 110".

Figure 1B:
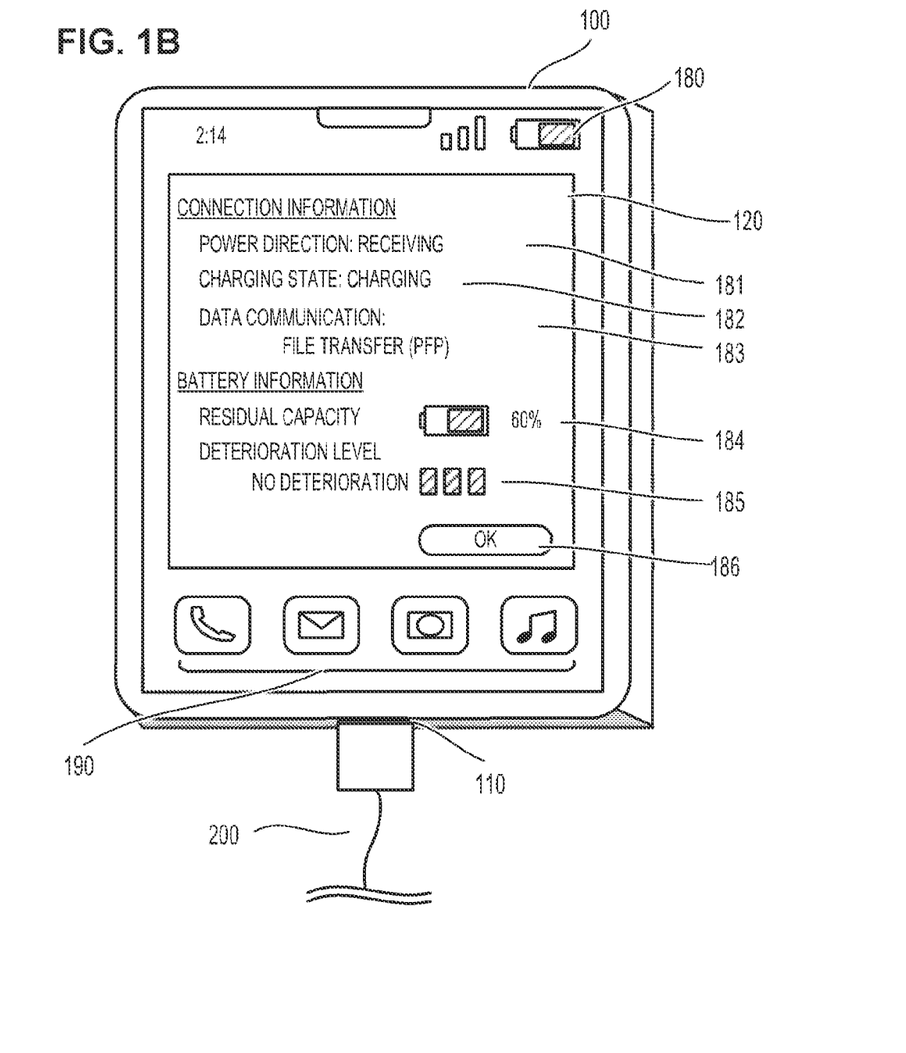

In step S1005, the control unit 150 displays the confirmation screen 120, which includes the connection information and the battery information, with the icon 180 on the display 108, as illustrated in FIG. 1B. For example, if a screen of an application of the electronic apparatus 100 is displayed on the display 108 when the predetermined touch operation is detected in S1003, the display screen of the application is switched to the confirmation screen 120 in S1005. The display 108 displays the power direction and the communication protocol which are determined in later mentioned steps S2002 and S2003, for example. Further, the display 108 displays information on the residual capacity and deterioration level of the battery 102 acquired in step S1001, for example. Furthermore, the display 108 may display the charging state of the battery 102.

In step S1006, the control unit 150 displays the battery information of the electronic apparatus 100 on the display 108. In other words, the battery information is displayed when the predetermined touch operation is performed on the icon 180, regardless of whether or not an external apparatus and electronic apparatus 100 are connected (USB connection). Note that the external apparatus is not connected (USB connection), such information as residual capacity and deterioration level of the battery 102 acquired in step S1001 is displayed without displaying the connection information. For example, if a screen of an application of the electronic apparatus 100 is displayed on the display 108 when the predetermined touch operation is detected in S1003, the display screen of the application is switched to the confirmation screen 120 in S1006.

The information displayed on the display 108 in steps S1005 and S1006 may be information other than the above-mentioned information, as long as the information is related to the connection information or the battery information. Further, the display 108 may display a part of the above-mentioned information. Furthermore, in steps S1005 and S1006, information on a number of images captured by the imaging unit 106 (image pickup element) may be displayed instead of the battery information. When the confirmation screen 120 is displayed in step S1005 or S1006 and the user touches the OK button 186, the control unit 150 ends the display of the confirmation screen 120.

The processing in the flow chart in FIG. 3B is started when the electronic apparatus 100 is connected to an external apparatus via USB connection. As mentioned above, the electronic apparatus 100 supplies or receives power to/from the external apparatus in accordance with the USB-PD standard.

In step S2001, the control unit 150 controls the PD communication unit 104, and sends power capability information of the electronic apparatus 100 to the external apparatus or receives the power capability information from the external apparatus via a CC pin of a Type-C connector of the connection unit 110. If the electronic apparatus 100 is a power supplying apparatus (Source), the power capability information includes information on power (e.g., voltage and current) that the electronic apparatus 100 can output. If the electronic apparatus 100 is a power receiving apparatus (Sink), the power capability information includes information on power (e.g., voltage and current) that the external apparatus connected to the electronic apparatus 100 can output.

In step S2002, the control unit 150 controls the PD communication unit 104 and performs CC communication with the external apparatus connected via USB connection, and determines the power direction. The PD communication unit 104 performs negotiation communication based on the communication protocol specified in the USB-PD standard, and determines the power direction with the external apparatus. The power direction information 181 in FIG. 1B indicates a direction of power flow between the electronic apparatus 100 and the external apparatus determined in step S2002.

In step S2003, the control unit 150 performs data communication with the external apparatus connected via USB connection, and determines a protocol of the data communication. Using the data line, the control unit 150 performs (establishes) data communication with the external apparatus based on the communication protocol specified in the USB standard. The communication type information 183 in FIG. 1B indicates the communication protocol determined in step S2003.

Conventionally, in order to display a power state among a plurality of apparatuses, the user must trace a plurality of layers (screens), such as the menu screen and the setup screen. Therefore, the user must close the current application in use (application of camera imaging, mail, WEB search, or the like) once. According to the present embodiment, however, the connection information (information related to the USB connection) and the battery information are displayed when the predetermined touch operation is performed on the icon 180. Hence even in a state where an application of the electronic apparatus 100 is started, the user can confirm the power state between the electronic apparatus 100 and the external apparatus 300 by an easy and intuitive operation. Therefore, user friendliness of the electronic apparatus 100 improves. In a case where the application of the electronic apparatus 100 is started, it is not needed other than the predetermined touch operation on the icon 180 for displaying the confirmation screen 120.

The electronic apparatus 100 may be any electronic apparatus as long as the apparatus can transfer (supply and receive) power with a specific external apparatus, and includes a display. The external apparatus may be any electronic apparatus if the apparatus is connectable with the electronic apparatus 100. "Any electronic apparatus" is a smartphone, a tablet terminal, a personal computer, an imaging apparatus (digital camera), a printer, or the like. In the above description, it is assumed that power is supplied and received among a plurality of apparatuses based on the USB-PD standard, but any standard may be used if power can be supplied and received among a plurality of apparatuses based on that standard.

According to the present embodiment, the user can easily confirm the power supplying state among a plurality of apparatuses.

In the above description, "processing advances to step S1 if A is at least B, and processing advances to step S2 if A is smaller (lower) than B" may be regarded as "processing advances to step S1 if A is larger (higher) than B, and processing advances to step S2 if A is not more than B". Conversely, "processing advances to step S1 if A is larger (higher) than B, and processing advances to step S2 if A is not more than B" may be regarded as "processing advances to step S1 if A is at least B, and processing advances to step S2 if A is smaller (lower) than B". This means that, as long as no inconsistency is generated, the phrase "at least A" may be regarded as "A or larger (higher; longer; more) than A", or may be regarded as "larger (higher; longer; more) than A". On the other hand, the phrase "not more than A" may be regarded as "A or smaller (lower; shorter; less) than A", or may be regarded as "smaller (lower; shorter; less) than A". Further, "larger (higher; longer; more) than A" may be regarded as "at least A", and "smaller (lower; shorter; less) than A" may be regarded as "not more than A".

While example embodiments have been described, the present invention is not limited to these specific embodiments, and various modes within the scope, not departing from the spirit of the invention, are included in the present disclosure. The above-mentioned embodiments may be partially combined as needed.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-146104, filed on Sep. 14, 2022, which is hereby incorporated by reference herein in its entirety.

What is claimed is:

1. An electronic apparatus that is capable of supplying and receiving power to and from an external apparatus connected to the electronic apparatus, the electronic apparatus comprising:
   a display;
   at least one processor; and
   at least one memory storing a program which, when executed by the at least one processor, causes the electronic apparatus to function as:
   a control unit configured to perform control such that a predetermined icon indicating information regarding power in the electronic apparatus is displayed on the display; and
   a detection unit configured to detect a predetermined touch operation on the predetermined icon displayed on the display,
   wherein
   the control unit performs control such that a predetermined screen is displayed on the display together with the predetermined icon in response to the predetermined touch operation on the predetermined icon detected by the detection unit, the predetermined screen including information on a direction of power flow between the electronic apparatus and the external apparatus connected to the electronic apparatus.

2. The electronic apparatus according to claim 1, wherein the predetermined icon indicates a state of a power supply of the electronic apparatus.

3. The electronic apparatus according to claim 1, further comprising a battery that is a power supply of the electronic apparatus, wherein
   the predetermined icon indicates at least one of residual capacity of the battery, a type of power supply driving the electronic apparatus, a charging state of the battery, and a communication state between the electronic apparatus and the external apparatus.

4. The electronic apparatus according to claim 1, wherein the control unit performs control such that the predetermined icon is constantly displayed in a case where a power supply of the electronic apparatus is in an ON state.

5. The electronic apparatus according to claim 1, wherein the program, when executed by the at least one processor, further causes the electronic apparatus to function as a power controller configured to receive power from the external apparatus connected to the electronic apparatus, and to supply power to the external apparatus connected to the electronic apparatus, and
   wherein the control unit 1) displays the information on the direction of power flow to indicate that power is currently being supplied to the external apparatus in accordance with the predetermined touch operation detected by the detection unit in a state of the power controller supplying power to the external apparatus, and 2) displays the information on the direction of power flow to indicate that power is currently being received from the external apparatus in accordance with the predetermined touch operation detected by the detection unit in a state of the power controller receiving power from the external apparatus.

6. The electronic apparatus according to claim 5, wherein the power from a battery that is a power supply of the electronic apparatus, is supplied to the external apparatus in a case where the power controller is supplying power to the external apparatus, and
   the battery is charged by power from the external apparatus in a case where the power controller is receiving power from the external apparatus.

7. The electronic apparatus according to claim 1, further comprising an image pickup element to capture an image, wherein
   the control unit controls the display to display the predetermined icon in at least one of: a case where a live view image is displayed to prepare for image capturing; a case where an image acquired by image capturing is reproduced; and a case where a screen to perform setting for image capturing is displayed.

8. The electronic apparatus according to claim 1, further comprising a battery, wherein
   the predetermined screen includes information on a charging state of the battery.

9. The electronic apparatus according to claim 1, wherein the predetermined screen includes information on a communication state between the electronic apparatus and the external apparatus.

10. The electronic apparatus according to claim 1, wherein
    the predetermined touch operation is one of: one touch, press and hold, swipe, double tap, and Pinch-Out.

11. The electronic apparatus according to claim 1, wherein
    the control unit performs a control such that a screen of an application of the electronic apparatus is displayed with the predetermined icon on the display in a case where the application is started up, and switches a display of the display from the screen of the application to the predetermined screen in accordance with the predetermined touch operation detected by the detection unit in a state where the screen of the application of the electronic apparatus is displayed with the predetermined icon on the display.

12. The electronic apparatus according to claim 11, wherein
    in response to an instruction of end of the display of the predetermined screen, the control unit switches a display on the display from the predetermined screen to the screen of the application.

13. The electronic apparatus according to claim 1, wherein
    the at least one memory and the at least one processor further function as a power controller configured to supply and receive power to/from the external apparatus connected to the electronic apparatus based on a Universal Serial Bus power delivery (USB PD) standard, and the power controller 1) supplies power to the external apparatus in a case where the electronic apparatus is a source of the USB PD, and 2) receives power from the external apparatus in a case where the electronic apparatus is a sink of the USB PD.

14. The electronic apparatus according to claim 13, further comprising a connector conforming to USB Type-C, wherein the electronic apparatus is connected to the external apparatus via a cable connected to the connector.

15. A control method for an electronic apparatus that is capable of supplying and receiving power to and from a connected external apparatus, the method comprising:

displaying a predetermined icon indicating information regarding power in the electronic apparatus on a display;

detecting a predetermined touch operation on the predetermined icon displayed on the display;

in a case where the predetermined touch operation on the predetermined icon is detected in the detecting, performing a control such that a predetermined screen is displayed on the display together with the predetermined icon, the predetermined screen including information on a direction of power flow between the electronic apparatus and the external apparatus connected to the electronic apparatus.

16. A non-transitory computer readable medium that stores a program, wherein the program causes a computer to execute a control method, the control method is a control method for an electronic apparatus that is capable of supplying and receiving power to and from a connected external apparatus, and the control method comprises:

displaying a predetermined icon indicating information regarding power in the electronic apparatus on a display; and detecting a predetermined touch operation on the predetermined icon displayed on the display, wherein in a case where the predetermined touch operation on the predetermined icon is detected in the detecting, performing a control such that a predetermined screen is displayed on the display together with the predetermined icon, the predetermined screen including information on a direction of power flow between the electronic apparatus and the external apparatus connected to the electronic apparatus.

* * * * *